United States Patent

[11] 3,607,186

[72] Inventor Lewis L. Bognar
      Painted Post, N.Y.
[21] Appl. No. 26,523
[22] Filed Apr. 8, 1970
[45] Patented Sept. 21, 1971
[73] Assignee Corning Glass Works
      Corning, N.Y.

[54] METHOD AND APPARATUS FOR FORMING HOLLOW ARTICLES FROM SHEET GLASS
9 Claims, 6 Drawing Figs.

[52] U.S. Cl. .................................................. 65/104,
      65/107, 65/182 A, 65/273, 65/285, 65/287
[51] Int. Cl. ...................................................... C03b 23/02
[50] Field of Search ............................................ 65/104,
      105, 106, 107, 182 A, 273, 285, 287

[56] References Cited
UNITED STATES PATENTS

| 2,377,849 | 6/1945 | Binkert et al. | 65/107 X |
| 2,682,730 | 7/1954 | Rossen | 65/104 |
| 3,177,060 | 4/1965 | Pedersen | 65/106 |
| 3,414,395 | 12/1968 | Reese et al. | 65/107 |

*Primary Examiner*—Arthur D. Kellogg
*Attorneys*—Clarence R. Patty, Jr. and Burton R. Turner

ABSTRACT: Sheet glass positioned upon a preheated forming mold is rapidly heated to approximately its softening point whereupon, as the sheet begins to sag, it is controllably fed into the forming cavity of the mold by the simultaneous application of vacuum to such cavity and pressure to a feeding surface surrounding such cavity, so as to form a hollow article of substantially the same uniform thickness as the glass sheet.

PATENTED SEP 21 1971 3,607,186
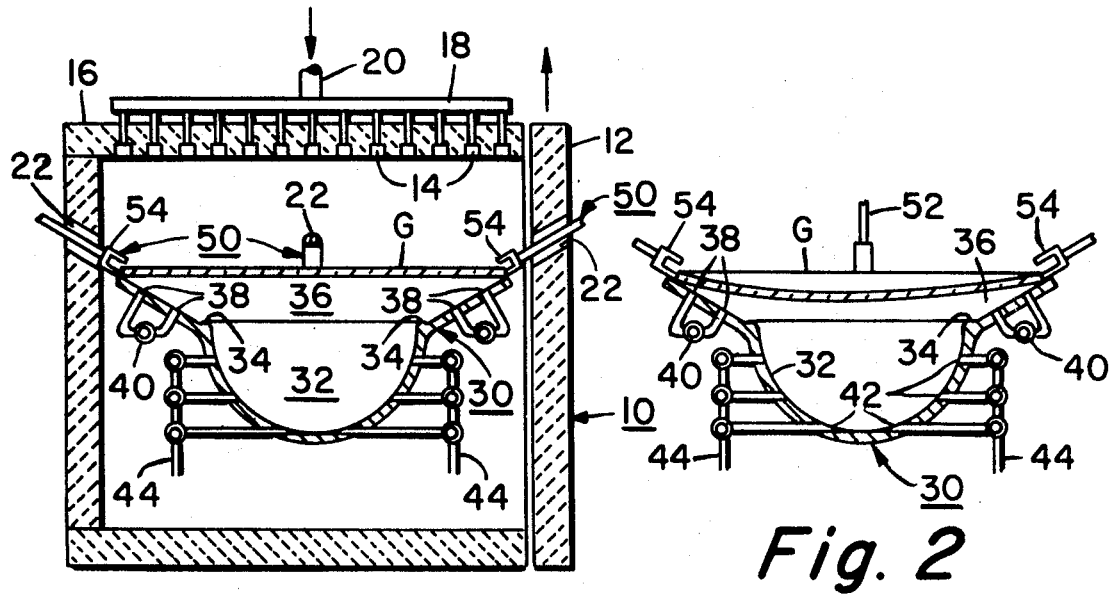
Fig. 1
Fig. 2
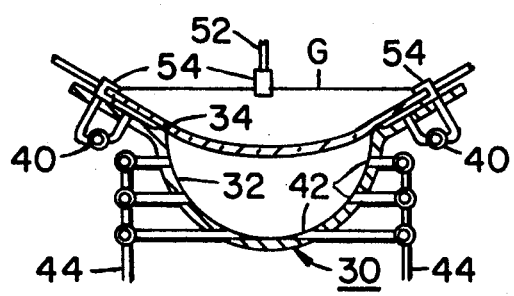
Fig. 3
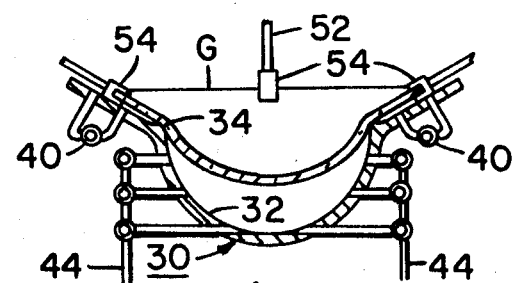
Fig. 4
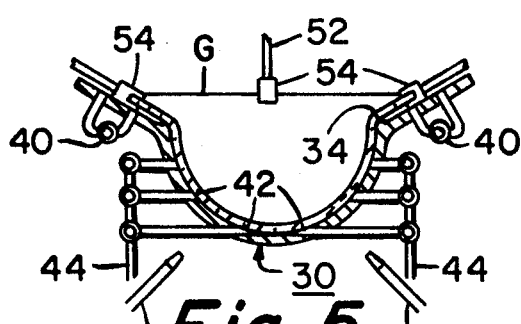
Fig. 5
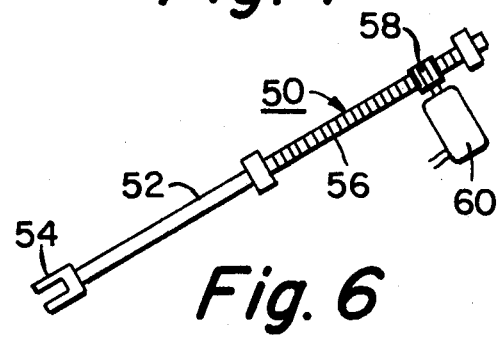
Fig. 6
INVENTOR.
Lewis L. Bognar
BY
*Burton R. Turner*
ATTORNEY

METHOD AND APPARATUS FOR FORMING HOLLOW ARTICLES FROM SHEET GLASS

BACKGROUND OF THE INVENTION

This invention pertains to the art of reshaping a planar sheet of glass through the application of heat to produce an initial sagging thereof, and final forming the sheet by the application of a vacuum while simultaneously feeding the sheet into a mold cavity to preserve thickness uniformity in the finished article.

In the past it has been known that hollow articles could be formed from sheet glass by applying heat and allowing the sheet to sag by gravity into a mold cavity. However, this has not been entirely satisfactory particularly when forming rather large size hemispheres as may be utilized in oceanography, since the mold entrance region of the glass about the rim of the hemisphere has a tendency to become thinner than the main body of the hemisphere. The thinning is the result of the pulling or stretching of the glass about the rim caused by the weight of the entire hemisphere being supported on the mold entrance region. In addition, the known process is inefficient since it not only requires a slow heating-up of the glass and mold assembly to inhibit thermal shock, but also requires sufficient time after viscous elongation begins for the glass to sag into conformity with the mold, and then more time must be spent to cool the glass-mold assembly down to room temperature where the glass can be separated from the mold. In general, good optical surface qualities are not obtainable due to the sustained glass surface contact with the heated mold surface.

U. S. Pat. No. 3,414,395 illustrates one attempt to overcome the problem of uneven thickness distribution which normally results from a sagging operation. However, the hemisphere forming operations disclosed by such patent are not entirely acceptable, since the process involves a time consuming multistep operation including the utilization of a plurality of molds, each of which makes glass surface contact with the sheet. In addition, the central point loading of the sheet is not a desirable expedient for obtaining thickness uniformity.

Although thinning of sheet glass is most evident when sagging by gravity, an undesirable degree of thinning still exists where the sheet is supported by the rim of the mold and sagging is assisted by vacuum. For example, in order to produce a 56 inches diameter hemisphere with a 1 ½1/2 inches wall thickness, utilization the sagging techniques of the prior art, it is necessary that the original thickness of the sheet glass be about 3 ¼1/2 inches. However, since sheet glass of such thickness is virtually unavailable, the prior art processes are not acceptable for making such large sized hemispheres.

The present invention overcomes the problems occasioned with the prior art methods by incorporating rapid heating of the mold and the glass sheet together with controlled feeding of the glass into the mold cavity by utilizing both pressure and vacuum, and minimizing the glass surface to mold contact time.

SUMMARY OF THE INVENTION

The present invention relates to process and apparatus for forming hollow articles, such as hemispheres, from planar sheet material in such a manner so that the thickness of the finished article is not only uniform but substantially the same thickness as the original planar sheet. In order to accomplish this novel result, a mold of desired configuration is preheated to about the softening point temperature of the glass sheet to be formed. The mold cavity is bounded by tapered feeding surfaces, having an inverted frustoconical shape. After the mold assembly has been brought up to temperature, a glass blank at room temperature and preferably of circular configuration or of polygonal configuration approaching circular shape, is positioned upon the conical feeding surfaces of the mold, and the glass-mold assembly is positioned within a suitable kiln.

Heat is applied to the upper surface of the glass sheet by means of overhead radiant-type gas-fired heaters, whereas the under surface of the sheet initially receives radiant heat from the preheated mold surface. As a result, not only do the major surfaces of the sheet initially receive radiant heat at substantially the same rate so that no detrimental thermal stresses are developed which might cause fracture, but also the glass is quickly heated to about its softening point. However, as the glass is heated, the mold surface has a tendency to become cooler since only a portion of the applied radiant heat passes through the glass, and the mold gives up heat both to the glass sheet and to the outside.

When the glass sheet reaches its softening point, it begins a downward sagging motion and forms a general catenary shape. Radially positioned glass feeding arms then engage outer peripheral portions of the blank to assist a uniform feeding of the blank into the interior of the mold cavity. In addition, the conical feeding surface of the mold is pressurized, thus creating positive air pressure between the mold and the glass surface to maintain the glass in a floating position over the conical entry region. At the same time, vacuum is applied within the mold cavity which not only assists in pulling the glass over a lip ring into the cavity, but also draws the sheet into conformity with the mold contour. Since the mold surface is relatively cool with respect to the glass, imprinting of the mold surface on the glass is minimized. After forming, the glass and mold assembly is removed from the kiln and sufficient cooling is applied to the mold in order to lower the glass temperature to about its annealing point, at which time the finished article may be removed from the mold.

It thus has been an object of the present invention to provide improved method and apparatus of forming relatively large hemispherical-shaped objects from sheet glass while maintaining thickness uniformity throughout the finished article commensurate with that of the original sheet.

A further object of the present invention has been to provide a method of and means for forming hollow objects form sheet glass with uniform thickness distribution by initially applying heat to both sides of the sheet at a substantially uniform rate, initially permitting the sheet to sag by gravity, and then assisting the uniform flow of the sheet into the cavity by the simultaneous application of a vacuum within the mold cavity, a pressurized glass-floating fluid bed about said cavity, and radially movable feeding arms.

BRIEF DESCRIPTION OF THE DRAWINGS

FIG. 1 is a somewhat schematic elevational view in section illustrating apparatus within a suitable kiln for forming hollow articles in accordance with the present invention.

FIGS. 2 through 5 inclusive illustrate various forming steps of the operation, with the kiln being omitted for purposes of simplicity.

FIG. 6 is an enlarged view of the feeder arm mechanism utilized in the present apparatus to facilitate the concentric feeding of the glass blank to the mold cavity.

DESCRIPTION OF THE PREFERRED EMBODIMENTS

Referring now to the drawings, and particularly FIG. 1, apparatus for forming hollow articles in accordance with the present invention is shown comprising a refractory kiln 10, a mold assembly 30, and glass-feeding means 50. The kiln 10 is shown having a door member 12 which may be upwardly opened to permit the mold assembly 30 to be inserted within and withdrawn from the interior of the kiln. In addition, a plurality of radiant-type gas-fired overhead heaters 14, mounted in the roof 16 of the kiln 10 are supplied with fuel and air by means of a header 18 and inlet 20. A plurality of openings 22 are formed in the walls and door of the kiln 10 to facilitate the insertion and operation of feeding means 50. A glass blank G, preferably of circular configuration, is shown positioned upon the upper extent of mold assembly 30.

Referring now particularly to FIGS. 2 through 5 inclusive, the mold assembly 30 is shown comprising a mold cavity 32 of desired contour terminating at its upper extent in a radiused neck portion or lip ring 34. An inverted frustoconical-shaped feeding surface 36 surrounds the mold cavity 32 and communicates with the lip portion 34. A plurality of openings 38 are formed in the conical feeding surface 36 around its extent, and communicate with a header 40 supplied with a suitable source of fluid under pressure. In a like manner, the mold cavity 32 is provided with a plurality of openings 42 about its extent which communicate with headers 44 connected to a suitable source of controllable vacuum.

Referring particularly to FIG. 5, a plurality of cooling nozzles 46 are shown being directed toward the mold assembly 30 to provide cooling fluid for cooling the mold and glass after the article has been formed and the mold assembly withdrawn from the kiln 10.

With reference particularly FIG. 6, the glass feeding means 50 is shown comprising a feeding arm 52 having a bifurcated end 54 for engaging edge surfaces of the glass sheet G. The feeding arms 52 may be fed radially inwardly in unison by any suitable means such as rack portion 56 on the upper end of arm 52 which cooperates with pinion 58 mounted on electric motor 60. As shown, a plurality of three or more feeder arms 52 are positioned radially about the mold assembly 30 and are capable of moving in unison parallel to the conical surface 36 to maintain the glass in alignment with respect to the mold cavity during feeding and forming.

In operation, the entire mold assembly 30 is positioned within the kiln 10 and heated by means of radiant heaters 14 to about the softening point of the glass to be formed. When the mold assembly has reached such temperature, a glass blank G at room temperature and preferably of round or multipolygonal configuration is positioned upon upper surface portions of the conical feeding surface 36. The feeding arms 52 radially extend inwardly and contact edge portions of the glass blank G to center the same on the mold, as shown in FIG. 1. After being placed upon the feeding surface 36 of the mold assembly 30, the glass blank G not only receives radiant heat on its under surface from the preheated surfaces of the mold, but also radiant heat is directed to the upper surface by means of overhead heaters 14. Accordingly, the glass sheet initially receives radiant heat through both of its major surfaces at substantially the same rate, and therefore there is no tendency for thermal stresses to develop which would normally fracture the glass upon the application of a unidirectional heat.

The glass is quickly heated to its softening point where it begins to sag downwardly by gravity into a catenary shape as shown in FIG. 2. As the sagging continues, glass feeding arms 52 engage edge portions of the glass and move in timed unison toward the interior of the mold. After the catenary shape has been formed, but before the sagged glass contacts lip ring portion 34, vacuum is applied to ports 42 by means of header 44 to pull the glass sheet downwardly into conformity with the mold contour, and simultaneously pressure is applied to openings 38 by means of header 40. The combination of pressurizing the conical feeding surface 36 to create a positive air pressure between the mold and the glass surface, functions to maintain the glass in a floating position over the entry region to the mold cavity, whereas the vacuum applied within the mold cavity functions to pull the air-supported glass over the lip ring and uniformly into the cavity for conformity with the cavity contour. The feeding arms 52 follow the glass motion to insure that the glass blank remains concentrically aligned over the mold cavity, and to a certain extent control the feeding rate into the mold.

Due to the fact that the mold surface loses heat by radiation during the sagging operation, the mold surface is relatively cool with respect to the sheet, and accordingly imprinting of the surface of the glass is minimized or completely eliminated upon contact with the mold surface. Immediately after forming, the mold assembly is removed from the kiln and cooled, either by means of the ambient atmosphere or by means of a cooling fluid such as air directed from nozzles 46. When the glass has been cooled to about its annealing point, the mold cooling is discontinued, and as a result the mold is reheated by the glass so that the mold surface expands and breaks away from the glass, thus freeing the glass for removal. The formed glass article is then removed from the mold for further heat treatment such as annealing, and the mold is indexed back into the kiln in order to reheat it and begin a new cycle. Severing of the newly formed article from any remaining skirt glass may be accomplished either before or after removal from the mold as desired.

Although various mold materials may be utilized, simple ceramic or refractory molds are adequate for producing small-sized hemispheres in low volume. However, for high volume production stainless steel molds are more desirable since they have a greater life span. When using stainless steel molds, however, the mold is preferably treated with a lubricating or parting agent such as pulverized mica in order to prevent the adhesion of the glass in the mold cavity, which may occur if the glass to mold contact time is not held to a minimum.

Although it will be apparent to those skilled in the art that the various operating parameters will vary with the composition and thickness of the starting sheet and the desired contour of the finished article, the following specific example is given as one illustration, and by no means is deemed to be limiting in nature.

A 1 inch thick sheet of standard soda lime window glass was cut into an octagonal configuration having a 24 inch diameter. A ceramic mold having a 16 inch hemispherical cavity, surrounded by a conical feeding surface, was positioned within a gas-air fired kiln and heated to a temperature of approximately 775° C., which is approximately the softening point of the soda lime glass. After reaching such temperature, the blank at room temperature was positioned on the mold feeding surface in the kiln and oriented in concentric position over the hemispherical cavity by three feeding arms.

The sheet was quickly heated to its softening point in just less than 3 minutes and began to sag into a catenary curve. A vacuum of 25 inches of mercury was applied to the mold cavity within about 20 seconds after the sheet began to sag, and prior to the time that it contacted the lip edge about the mold cavity. At the same time as the vacuum was applied, a small positive pressure of under 10 p.s.i.g. as applied to the feeding surfaces of the mold, and the sheet was quickly and uniformly pulled into the mold cavity and formed into final shape. The mold was then removed from the kiln and air cooling applied until the temperature of the mold is lowered to about the annealing point of the glass, whereupon the completed hemisphere was removed from the mold for final finishing and heat treat. The flexibility of the operation will be appreciated by those skilled in the art when it is recognized that for a glass thickness of only one-eighth inch, the amount of vacuum required may be reduced to about 5 inches of mercury.

Although I have disclosed the now-preferred embodiment of my invention, it will be apparent to those skilled in the art that various changes and modifications may be made thereto without departing from the spirit and scope thereof as defined in the appended claims.

I claim:

1. Apparatus for forming hollow articles from sheet glass which comprises, a mold assembly, said mold assembly including a mold cavity of desired configuration and a tapered feeding surface surrounding the upper limit of said mold cavity, means for providing a vacuum to said mold cavity, means for supplying fluid under pressure to said feeding surface; glass-feeding means for maintaining a glass blank to be formed in concentric alignment over said mold cavity; and means for applying radiant heat to the glass sheet.

2. Apparatus as defined in claim 1 including a raised radiused neck ring portion extending about the entrance of said mold cavity, between said mold cavity and said tapered feeding surface, to provide a barrier between said vacuum means and said pressure means.

3. Apparatus as defined in claim 1 wherein said glass-feeding means includes, a plurality of feeding arms, and means for moving said arms in unison radially inwardly toward the center of said mold cavity.

4. Apparatus as defined in claim 3 wherein the means for moving said arms radially inwardly includes a rack portion formed on an outer end of each said arm, a pinion cooperably engageable with said rack portion, and controllable electric motor means for driving said rack and pinion to linearly move said feeding arm inwardly and outwardly with respect to the center of said mold cavity.

5. A method of forming hollow articles from sheet glass including the steps of preheating a mold having a cavity of desired configuration to a temperature approximately the softening point temperature of the sheet glass to be formed, initially supporting a blank of sheet glass to be formed on a surface above the preheated mold cavity, simultaneously applying radiant heat to the upper and lower surfaces of said blank to rapidly heat the same to approximately its softening point, permitting the softened sheet to initially free sag by gravity, then applying vacuum to the mold cavity while simultaneously providing between said blank and the supporting surface above said cavity fluid at a higher pressure than said vacuum, and pulling said softened sheet into the mold cavity by suction to vacuum form an article therein.

6. A method as defined in claim 5 wherein the vacuum is applied to the cavity and the pressure applied to the supporting surface prior to such time as the freely sagging sheet contracts the cavity therefrom.

7. A method of forming hollow articles as defined in claim 5 wherein the mold is cooled to approximately the annealing temperature of the glass, and then the newly formed article is removed therefrom.

8. A method of forming hollow articles as defined in claim 5 wherein edge portions of the glass blank are guided during the pulling of the blank into the mold cavity so as to maintain the glass concentrically aligned over such cavity.

9. A method of forming hollow articles as defined in claim 5 wherein said mold is preheated to approximately the softening temperature of the glass to be formed in a gas-air fired kiln, a substantially round glass blank to room temperature is positioned on the supporting surface, and radiant heat is initially applied to both sides of the glass sheet at a substantially equal rate by the emission of radiant heat from the preheated mold surface to the under surface of the glass blank and by the application of radiant heat from the gas-air heaters to the upper surface of the glass blank.

UNITED STATES PATENT OFFICE
CERTIFICATE OF CORRECTION

Patent No. 3,607,186    Dated 9/21/71

Inventor(s) Lewis L. Bognar

It is certified that error appears in the above-identified patent and that said Letters Patent are hereby corrected as shown below:

Column 1, line 46, "1 1/2 1/2" should read --1 1/2--; Column 1, line 47, "utilization" should read --utilizing--; Column 1, line 49, "3 1/4 1/2" should read --3 1/4--; Column 3, line 14, "are shown being" should read --are shown as being--; Column 3, line 18, "particularly FIG. 6" should read --particularly to FIG. 6--; Column 4, line 24, "starting sheet and" should read --starting sheet glass and--;

Column 4, line 48, "mold is lowered" should read --mold was lowered--; Column 4, line 55, "embodiment" should read --embodiments--; Column 6, line 5, "the cavity therefrom." should read --the cavity entrance.--.

Signed and sealed this 25th day of April 1972.

(SEAL)
Attest:

EDWARD M. FLETCHER, JR.
Attesting Officer

ROBERT GOTTSCHALK
Commissioner of Patents